July 24, 1934. J. E. RUBY 1,967,629
ANIMAL TRAP
Filed Feb. 13, 1934
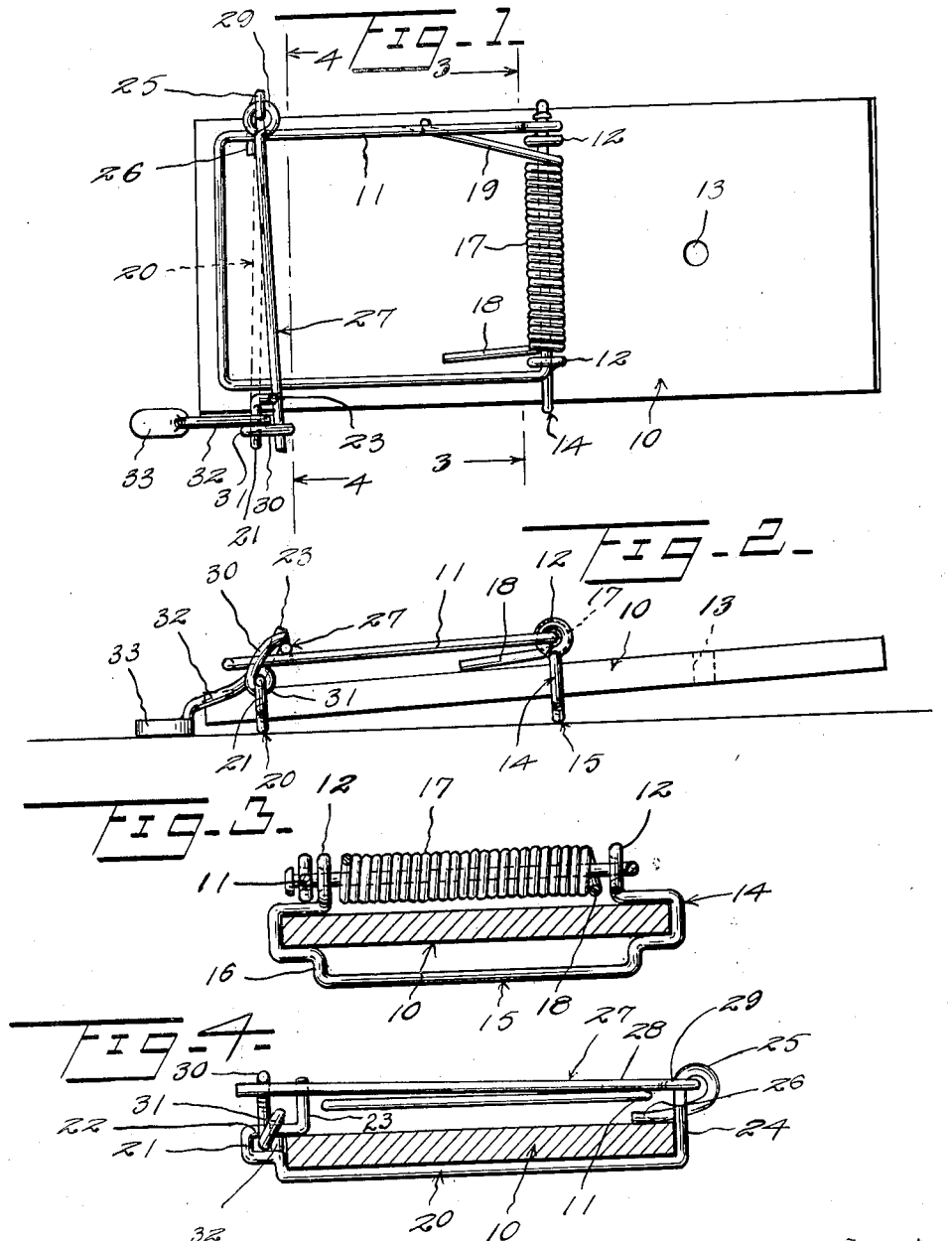
Inventor
J.E.Ruby
By Watson E. Coleman
Attorney Patented July 24, 1934

1,967,629

UNITED STATES PATENT OFFICE 1,967,629

ANIMAL TRAP

James Edward Ruby, Waynoka, Okla.

Application February 13, 1934, Serial No. 711,046

3 Claims. (Cl. 43—81)

This invention relates to animal traps and has for an important object thereof the provision of a trap wherein the tripping mechanism is unset by gravity.

Another object of this invention is to provide a trap of this kind wherein the setting mechanism is held in set position by a balanced platform which when unbalanced will unset the tripping mechanism.

A further object of this invention is to provide a trap of this kind which is adapted to be used for rodents or the like and which is so constructed that the weight of the animal engaging a raised end of the trap will unset the movable jaw which is secured by a tripping mechanism at the opposite or lower end of the trap.

The above and various other objects and advantages of this invention will in part be described and in part be understood from the following detailed description of the present preferred embodiment, the same being illustrated in the accompanying drawing wherein:—

Figure 1 is a detail top plan view of a trap constructed according to the preferred embodiment of this invention.

Figure 2 is a detail side elevation of the trap in set position.

Figure 3 is a sectional view taken on the line 3—3 of Figure 1.

Figure 4 is an enlarged sectional view taken on the line 4—4 of Figure 1.

Referring to the drawing wherein like numerals of reference designate corresponding parts throughout the several views, the numeral 10 designates generally a base or rockable platform which, in the present instance, is constructed out of a flat strip of material of rectangular configuration in plan. The base 10 is provided adjacent one end with a bait receiving opening 13, and this end in which the opening 13 is disposed is the end which is adapted to be raised when the trap is in set position.

A substantially O-shaped jaw member 11 is mounted in a pair of eyes 12 which are secured to U-shaped base engaging members 14. These base engaging members 14 are constructed preferably of relatively heavy wire and are integral one with the other, being connected by means of an elongated U-shaped member 15. The U-shaped member 15 has the bight thereof relatively long with the parallel legs 16 connected to the lower leg of each of the U-shaped members 14 and the bight of the U-shaped member 15 is adapted to engage the ground or a plane surface and serves as a fulcrum for the base 10.

Preferably the fulcrum for the base 10 is disposed slightly off the center of the base 10, so that normally the end of the base 10 opposite from the bait receiving opening 13 will be lowermost when the trap is in set position. A coil spring 17 engages about one side of the jaw member 11 having one end 18 thereof engaging the top of the base 10 and the other end 19 engaging the jaw 11 outwardly of the pivotal mounting of the jaw 11 on the base 10.

A bar 20 engages beneath the base 10 in spaced relation to the pivotal mounting for the jaw 11, being disposed adjacent the rear end of the base 10, and is provided at one end with an offset substantially U-shaped portion 21 which has the upper parallel leg 22 thereof extending inwardly of the upper surface of the base 10 and terminating in a bar 23 which is inclined forwardly. The opposite end of the bar 20 has a right angular extension 24 which is provided with an eye 25 and an extension 26 engaging the top of the base 10. This extension 26 coacts with the inner end of the parallel leg 22 in holding the bar 20 in desired position on the base 10.

A trigger 27 in the form of an elongated bar 28 having an eye 29 engaged with the eye 25 extends transversely of the base 10 when the jaw 11 is in set position, and is adapted to engage over the jaw 11 and contact with the forwardly inclined bar 23 which coacts with the tripping mechanism hereinafter described in holding the trigger 27 in set position. A trigger holding member 30 having an eye 31 is pivoted on the leg 22 of the U-shaped member 21 and an extension 32 is integral with the trigger holding member 30 and extends in a rearward and downward direction terminating in a weighted foot 33.

In the use and operation of the trap hereinbefore described, the jaw 11 is adapted to be swung rearwardly in a manner to tension the spring 17. The jaw holding member 27 is then swung inwardly over the top of the jaw 11 and disposed on the forward side of the forwardly extending bar 23. The holding member 30, which is disposed on a slight curvature, is then swung on the pivot 22, so as to engage the jaw holding member 27, whereupon the trap 10 is placed on a plane surface with the weight 33 engaging the plane surface and the base 10 disposed on an inclination to the horizontal with the end having the bait receiving opening 13 raised. When the animal endeavors to remove the bait 13, it will be necessary, in order to remove the bait, that the animal wholly or partly stand on the base 10 forwardly of the spring 17, and the weight of the animal will thereby cause the forward end of the base 10 to be lowered, which action will cause the weight 33 to swing the holding member 30 into released position and permit the jaw 11 to be swung forwardly by means of the spring 17.

It will be apparent from the foregoing that the trap herein disclosed will not be unset by the animal eating the bait but will be unset when the animal places any weight on the base 10 which is sufficient to rock the base 10 downwardly. The bar 23, which is disposed on a forward inclination, coacts with the holding member 30 in holding the trigger or jaw holding member 27 in set position.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A trap, comprising a base, a spring pressed jaw, means for pivotally mounting said jaw on said base forwardly of the longitudinal center thereof, a jaw holding member pivotally carried by the base adjacent the rear thereof, means carried by the base forwardly of the center to mount the base for rocking movement on a plane surface, a tripping means at the rear of the base for holding said holding member in set position, and a weight carried by said tripping means to rock said tripping means in released position when the rear end of the base is raised.

2. A trap, comprising a base, a spring pressed jaw pivotally carried by the base, means disposed on the lower side of the base for unbalancing the base on a plane surface whereby the rear end will be lowermost and the forward end uppermost, and means carried by the rear end of the trap and engaging the jaw when in set position and the rear end is lowermost to gravitatingly hold the jaw in set position, said latter means moving into released position when the forward end of the base is rocked downwardly and the rear end rocked upwardly.

3. A trap as set forth, comprising a base, a spring pressed jaw mounted on the base intermediate the ends thereof, means carried by the base intermediate the ends thereof to mount the base on an inclination to the horizontal with the rear end lowermost and the forward end uppermost, a jaw holding member, means for mounting said jaw holding member adjacent the rear of the base, a tripping member for holding said jaw holding member in set position, and a weight carried by said tripping member for swinging said tripping member into released position when the rear end of the trap is raised, said weight coacting with the tripping member to hold the jaw holding member in set position when the rear end of the base is lowermost.

JAMES EDWARD RUBY.